(12) United States Patent
Ezawa et al.

(10) Patent No.: US 7,093,271 B2
(45) Date of Patent: Aug. 15, 2006

(54) DISK DRIVE

(75) Inventors: Kozo Ezawa, Hirakata (JP); Masahiro Inata, Itami (JP); Yoshito Saji, Ashiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/521,068

(22) PCT Filed: Jul. 23, 2003

(86) PCT No.: PCT/JP03/09358

§ 371 (c)(1),
(2), (4) Date: Jan. 12, 2005

(87) PCT Pub. No.: WO2004/012189

PCT Pub. Date: Feb. 5, 2004

(65) Prior Publication Data

US 2005/0240948 A1 Oct. 27, 2005

(30) Foreign Application Priority Data

Jul. 26, 2002 (JP) .............................. 2002-217855

(51) Int. Cl.
*G11B 23/03* (2006.01)

(52) U.S. Cl. ...................... 720/643; 720/640; 720/742; 720/719; 720/725; 720/738; 720/739

(58) Field of Classification Search ................. 720/643
See application file for complete search history.

(56) References Cited

U.S. PATENT DOCUMENTS

| 4,682,322 A | * | 7/1987 | Ohta | 720/742 |
| 4,799,121 A | * | 1/1989 | Takahashi | 360/133 |
| 5,260,931 A | * | 11/1993 | Sasaki et al. | 720/742 |
| 6,477,138 B1 | * | 11/2002 | Cho et al. | 720/742 |
| 6,480,458 B1 | * | 11/2002 | Konno et al. | 720/644 |
| 6,590,858 B1 | * | 7/2003 | Inoue | 720/742 |
| 2001/0046104 A1 | | 11/2001 | Inoue et al. | |
| 2002/0012316 A1 | * | 1/2002 | Inoue et al. | 369/291 |
| 2003/0058785 A1 | * | 3/2003 | Kurosawa | 369/291 |
| 2003/0174640 A1 | * | 9/2003 | Iwaki et al. | 369/291 |
| 2004/0052204 A1 | | 3/2004 | Okazawa et al. | |
| 2004/0062175 A1 | * | 4/2004 | Inoue | 369/77.2 |

FOREIGN PATENT DOCUMENTS

| JP | 09-153264 A | 6/1997 |
| JP | 11-339424 A | 12/1999 |

* cited by examiner

*Primary Examiner*—William Korzuch
*Assistant Examiner*—Matthew Greco Kayrish
(74) *Attorney, Agent, or Firm*—Akin Gump Strauss Hauer & Feld, LLP

(57) ABSTRACT

A disc drive according to the present invention is adapted to a disk cartridge including: a disk; a body to contain the disk; a window provided for the body to allow a data reading and/or writing head to access the disk; a shutter for opening or closing the window; and a rotational member including a gear as a part of its outer periphery and rotating to open or close the shutter.

The drive includes a shutter driving mechanism for opening and closing the shutter by rotating the rotational member of the disk cartridge, and the shutter driving mechanism includes a driving gear, which engages with the gear of the rotational member and which turns around a first rotation shaft. The first rotation shaft swings around the center of rotation of the rotational member of the disk cartridge that is held on the holding portion.

18 Claims, 13 Drawing Sheets

DISK DRIVE

CROSS-REFERENCE TO RELATED APPLICATIONS

This application is a section 371 of International Application No. PCT/JP2003/009358, filed Jul. 23, 2003, the disclosure of which is incorporated herein by reference.

TECHNICAL FIELD

The present invention relates to a disk drive for reading and/or writing data from/on a data storage medium such as an optical disk or a magnetic disk, which is contained in a cartridge type casing.

BACKGROUND ART

Various disk-shaped data storage media are used extensively today. Examples of data storage media for performing read and/or write operations with a light beam include CDs, DVDs, and DVD-RAMs. On the other hand, a floppy disk is a data storage medium for performing read and/or write operations with magnetism. Furthermore, MOs and MDs for performing read and/or write operations with both a light beam and magnetism have also become popular.

Among these disk-shaped data storage media, DVD-RAMs, MOs and so on are contained in a cartridge for the purpose of protecting the data storage layer thereof. Japanese Patent Application Laid-Open Publication No. 9-153264 discloses a cartridge such as that shown in FIG. 10 as such a cartridge.

The disk cartridge 100 includes a cartridge body 101 for containing a writable/readable disk 102 and a shutter 103. A window 101A for getting the disk 102 chucked and allowing a read/write head to access the disk 102 is provided on both sides of the cartridge body 101. The shutter 103 protects the disk 102 that is exposed through the window 101A. For that purpose, the shutter 103 has a square bottomed U-shape. The shutter 103 is supported on the cartridge body 101 so as to be movable in the direction pointed by the arrow P, and elastic force is applied from a spring (not shown) to the shutter 103 in the opposite direction to that pointed by the arrow P. Accordingly, while no external force is applied to the shutter 103, the window 101A is closed with the shutter 103.

As shown in FIG. 7, a disk drive, adapted to the disk cartridge 100, includes a shutter opener 104 for opening and closing the shutter 103. When the disk cartridge 100 containing the disk 102 is loaded into the disk drive to read and/or write data from/on the disk 102, the disk cartridge 100 is inserted in the direction pointed by the arrow Q. Then, the notched portion 103A of the shutter 103 gets engaged with the protrusion 104A of the shutter opener 104. As the disk cartridge 100 is inserted deeper, the shutter opener 104 turns around the center of rotation 104B in the direction pointed by the arrow R. As a result, the shutter 103, engaged with the shutter opener 104, moves in the direction pointed by the arrow P.

When the disk cartridge 100 is inserted fully, the shutter 103 will have completed its movement in the direction pointed by the arrow P. Consequently, the disk 102 is exposed through the window 101A.

In the disk cartridge 100 shown in FIG. 10, the shutter 103 has a square bottomed U-shape with a flat bottom as described above. However, a shutter with such a shape requires a highly sophisticated machining technique. Also, to keep the shutter 103 in shape constantly, the machining process must be carried out with high precision. Thus, the cost for the shutter 103 as a single part is so high as to raise the overall manufacturing cost of the disk cartridge 100 significantly. Furthermore, the shutter structure described above cannot contribute to reducing the thickness of the disk cartridge 100 effectively. Consequently, with such a shutter structure, it is difficult to fill the consumers' demand for smaller storage media, which is also a problem.

In addition, considering the structure of the shutter 103, a gap is easily created between the cartridge body 101 and the shutter 103. Thus, dust and dirt may enter the disk cartridge and affect the read and/or write operations.

Plus, the disk drive described above opens the shutter 103 while the disk cartridge is being loaded. Accordingly, while being loaded into the disk drive, the disk 100 is partially exposed through the window 101A. Consequently, dust or dirt may deposit on the disk 100 to possibly affect the read and/or write operation on the disk 102.

To overcome these problems, Japanese Patent Application Laid-Open Publication No. 2002-50148 (and its corresponding U.S. Pat. No. 6,590,858) discloses a disk cartridge including a plurality of flat-plate shutters. As shown in FIG. 11, the disk cartridge 200 includes a cartridge body 201, shutters 202 and 203, and a rotational member 204. Although the body of the disk cartridge 200 actually consists of an upper shell and a lower shell, the upper shell is not shown in FIG. 11.

The cartridge body 201 has a window 201C for getting the disk chucked and allowing a read/write head to access the disk 205. While no chucking or head access is needed, the window 201C is closed with the shutters 202 and 203. The shutters 202 and 203 are interlocked with, and opened and closed by, the rotational member 204. The rotational member 204 rotates around a point that substantially matches the center of the disk 205 stored. The rotational member 204 also has a window 204G that has almost the same shape, and will be located at substantially the same position, as the window 201C when the shutters 202 and 203 open the window 201C fully.

A pair of link spindles 201A and 201B is additionally provided for the cartridge body 201 so as to be inserted into the link grooves 202B and 203B of the shutters 202 and 203, respectively.

Also, the rotation holes 202A and 203A of the shutters 202 and 203 are fitted with the rotation shafts 204A and 204B of the rotational member 204, thereby securing the shutters 202 and 203 to the rotational member 204 in a rotatable position.

FIGS. 12 to 14 illustrate how the rotational member 204 and the shutters 202 and 203 operate in the disk cartridge 200.

FIG. 12 illustrates a situation where the shutters are closed. In this situation, if the rotational member 204 is rotated in the direction pointed by the arrow S, then the rotation shafts 204A and 204B and the rotation holes 202A and 203A will turn in the directions pointed by the arrows T1 and U1, respectively. In the meantime, the link grooves 202B and 203B slide along the link spindles 201A and 201B in the directions pointed by the arrows T2 and U2, respectively.

If the rotational member 204 is further rotated in the arrow direction S, the shutters 202 and 203 start to open themselves as shown in FIG. 13. When the rotational member 204 is rotated to the limit, the shutters 202 and 203 will be fully opened as shown in FIG. 14. At this point in time, the windows 201C and 204G substantially match each other, thereby getting the disk 205, stored in the disk cartridge, ready to be chucked and the read/write head (not shown) ready to access the disk.

To close the shutters and the window 201C, the rotational member 204 needs to be rotated in the opposite direction to that pointed by the arrow S such that the rotational member 204 and the shutters 202 and 203 will do the opposite operations.

In order to open and close the shutters this way with good stability, the disk cartridge needs to be held firmly. To allow the disk cartridge 200 to perform the above operations within the disk drive, the side surfaces of the disk cartridge 200 are preferably held by holding members 211L and 211R as shown in FIGS. 12 to 14.

According to Japanese Patent Application Laid-Open Publication No. 2002-50148, a first notch 204D, a gear portion 204E and a second notch 204F, provided for the rotational member 204, and the shutter driving means 250 shown in FIG. 15 are used to rotate the rotational member 204 in the disk drive. The shutter driving means 250 includes a first raised portion 251, a rack portion 252 and a first raised portion 253. By shifting the shutter driving means 250 parallel to the side surface of the disk cartridge 200, the first raised portion 251, rack portion 252 and second raised portion 253 get engaged with the first notch 204D, gear portion 204E and second notch 204F, respectively, thereby rotating the rotational member 204.

However, to slide the bar driving means 250 shown in FIG. 15 near the side surface of the disk cartridge 200, there should be a space for allowing the driving means 250 to move in the vicinity of that side surface of the disk cartridge. Then, it is difficult to provide the holding member 211R described above. Consequently, the disk cartridge 200 could not be held firmly or the driving means 250 and the rotational member 204 could not get engaged with each other as intended.

DISCLOSURE OF INVENTION

In order to overcome the problems described above, an object of the present invention is to provide a disk drive, which is adapted to a disk cartridge with a structure for opening and closing a shutter by rotating a rotational member, which has a space-saving and simplified design, and which also has a mechanism that can open and close the shutter safely and just as intended.

A disc drive according to the present invention is adapted to a disk cartridge, which includes: a disk; a body to contain the disk; a window, which is provided for the body so as to allow a data reading and/or writing head to access the disk; a shutter for opening or closing the window; and a rotational member, which includes a gear as a part of its outer periphery and which rotates to open or close the shutter. The disk drive includes: a motor for spinning the disk; a holding portion for holding the disk cartridge so as to allow the motor to spin the disk; the data reading and/or writing head, which is movable almost along the radius of the disk that is held on the holding portion; and a shutter driving mechanism for opening and closing the shutter by rotating the rotational member of the disk cartridge. The shutter driving mechanism includes a driving gear, which engages with the gear of the rotational member and which turns around a first rotation shaft. The first rotation shaft swings around the center of rotation of the rotational member of the disk cartridge that is held on the holding portion.

In one preferred embodiment, the rotational member of the disk cartridge includes first and second notches, which are defined along the outer periphery so as to interpose the gear between them, and the shutter driving mechanism further includes first and second lever portions that engage with the first and second notches, respectively.

In another preferred embodiment, the shutter driving mechanism is able to swing around the center of the rotational member of the disk cartridge.

In another preferred embodiment, the first and second lever portions transmit rotational driving force to the rotational member while swinging around the center of rotation of the rotational member.

In another preferred embodiment, the first and second lever portions form integral parts of a single driving lever.

In another preferred embodiment, the driving lever is rotatable around the first rotation shaft.

In another preferred embodiment, the driving gear includes a big gear and a small gear, which is provided coaxially with the big gear and which turns synchronously with the big gear, and the shutter driving mechanism further includes a front gear engaging with the small gear.

In another preferred embodiment, the pitch diameter of the front gear is larger than that of gear teeth of the rotational member.

In another preferred embodiment, the driving gear is an intermittent gear, which has no gear teeth where the driving gear does not engage with the gear of the rotational member.

In another preferred embodiment, in reading or writing no data from/on the disk, the disk drive controls the shutter driving mechanism so as to close the shutter.

In another preferred embodiment, the shutter driving mechanism further includes: a holder for holding together the driving gear, the first lever portion and the second lever portion; and a base for supporting the holder so as to allow the holder to swing around the center of rotation of the rotational member. The base is movable almost along the radius of the disk.

In another preferred embodiment, the front gear is an internal gear, which is secured to the base so as to turn around the center of rotation of the rotational member.

In another preferred embodiment, the base has a cam groove, and at least one of the first and second lever portions has a protrusion that interlocks with the cam groove.

In another preferred embodiment, the holder is driven by a driving portion that shifts substantially parallel to a side surface of the body. The side surface has a window to partially expose the rotational member.

In another preferred embodiment, the disk drive further includes a traverse chassis with a guide for guiding the head almost along the radius of the disk. The head is supported on the guide and the motor is fixed on the traverse chassis.

In another preferred embodiment, the disc drive further includes a driving plate for lifting or lowering the traverse chassis.

In another preferred embodiment, the traverse chassis has a protrusion and the driving plate has a cam groove that fits with the protrusion, and the driving plate shifts substantially parallel to the side surface of the body, thereby lifting or lowering the traverse chassis.

In another preferred embodiment, the driving portion is a protrusion provided on the driving plate.

BEST MODE FOR CARRYING OUT THE INVENTION

Figure 1:
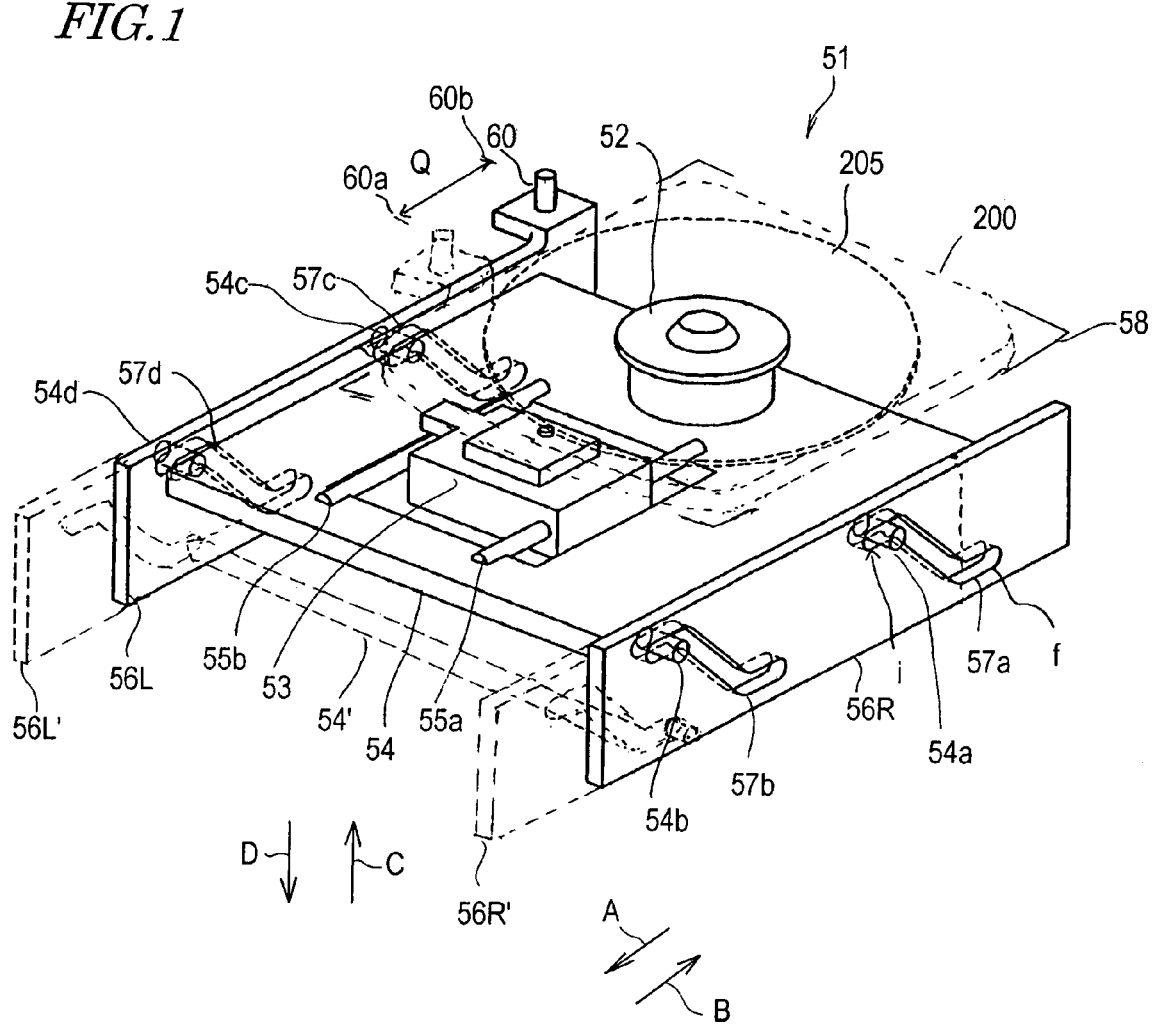
FIG. 1 is a perspective view illustrating an embodiment of a disk drive according to the present invention and showing its structure near the head and motor thereof.

Hereinafter, an embodiment of a disk drive according to the present invention will be described. FIG. 1 is a perspective view illustrating a main portion of a disk drive 51 and showing the structure near the read/write head thereof. The disk drive 51 may read and write data from/on the disk 205 stored in the disk cartridge 200 that has already been described with reference to FIGS. 11 through 15, for example. That is to say, the disk drive 51 is adapted to the disk cartridge 200.

As already described with reference to FIGS. 11 through 15, the disk cartridge 200 includes the cartridge body 201, shutters 202 and 203 and rotational member 204. The cartridge body 201 stores the disk 205 and has the window 201C for allowing a data reading and/or writing head to access the disk 205. The window 201 may be either opened or closed depending on the position of the shutters 202 and 203. The shutters 202 and 203 are interlocked with the rotational member 204. The rotational member 204 rotates around a point that substantially matches the center of the disk 205, thereby opening and closing the shutters 202 and 203. To rotate the rotational member 204, part of the rotational member is exposed through a window on a side surface of the cartridge body 201.

The gear 204E is provided on the outer periphery of the rotational member. And the first and second notches 204D and 204F are further vided on the outer periphery so as to interpose the gear 204 between them.

The following preferred embodiments of the present invention will be described as a disk drive adapted to the disk cartridge 200. However, the disk cartridge 200 is not the only disk cartridge to which the disk drive of the present invention can be adapted. Rather the present invention is applicable to any other disk cartridge as long as the disk cartridge includes a shutter over a head access window and opens and closes the shutter by rotating a rotational member. Even so, the gear and at least one of the first and second notches are preferably provided on the outer periphery of the rotational member. For example, the disk drive of the present invention may also be adapted to a disk cartridge as disclosed in PCT International Patent Application Publication No. WO 03/041076, which uses the rotational member to open and close the shutter, with the gear and first and second notches additionally provided for the disk cartridge.

As shown in FIG. 1, the disk drive 51 includes a spindle motor 52, a data reading and/or writing head 53, a holding portion 58 and a traverse chassis 54.

The holding portion 58 holds the disk cartridge 200, in which the disk 205 is stored, at a predetermined position within the disk drive 51. As will be described in detail later, at that position, the disk 205 is mounted on the spindle motor 52 and gets ready to spin. The holding portion 58 is typically a disk tray, for example. In that case, by moving the tray in the direction pointed by the arrow B, the tray is ejected out of the disk drive, and by moving the tray in the direction pointed by the arrow A, the disk cartridge is inserted into the disk drive. In FIG. 1, the specific shape of the disk tray is not illustrated to show the other structures clearly. Optionally, the disk drive 51 may have a so-called "slot-in" structure. In that case, a mechanism for loading and unloading the disk cartridge mounts the disk cartridge on the holding portion 58.

The spindle motor 52 and the head 53 are supported on the traverse chassis 54. More specifically, the spindle motor 52 is fixed on a predetermined location of the traverse chassis 54 to mount and spin the disk 205 thereon. On the other hand, the head 53 is supported by a pair of guides 55a and 55b, which is provided for the traverse chassis 54, so as to be movable in the direction in which the guides 55a and 55b extend. These guides 55a and 55b are provided substantially parallel to one of a plurality of lines extending radially from the center of the spindle motor 52. Thus, the guides 55a and 55b can move along the radius of the disk 205 that is mounted on the spindle motor 52. On two side surfaces of the traverse chassis 54, which are opposed to each other with the head interposed between them, two pairs of engaging pins 54a, 54b and 54c, 54d are provided. The movement of the traverse chassis 54 is regulated so as to be movable only in the direction pointed by the arrow C or D.

The disk drive 51 further includes driving plates 56R and 56L. The driving plate 56R has cam grooves 57a and 57b, while the driving plate 56L has cam grooves 57c and 57d. The engaging pins 54a and 54b are inserted into the cam grooves 57a and 57b, respectively. And the engaging pins 54c and 54d are inserted into the cam grooves 57c and 57d, respectively.

As shown in FIG. 1, each of these cam grooves includes an initial end portion i and a final end portion f, which extend in the direction pointed by the arrow A or B and which are provided at mutually different levels for the driving plate 56R or 56L, and a sloped portion for connecting these end portions together.

If the driving plates 56R and 56L are moved from the position shown in FIG. 1 in the direction pointed by the arrow A, then the engaging pins 54a and 54b located in the cam grooves 57a and 57b move along and within the cam grooves 57a and 57b and the engaging pins 54c and 54d located in the cam grooves 57c and 57d move along and within the cam grooves 57c and 57d. As a result, the traverse chassis 54 descends in the direction pointed by the arrow D. When the engaging pins 54a and 54b reach the ends of the cam grooves 57a and 57b and when the engaging pins 54c and 54d reach the ends of the cam grooves 57c and 57d, respectively, the traverse chassis 54 is lowered fully. At this point in time, the driving plates 56R and 56L have moved to the positions shown by the phantoms 56R' and 56L', respectively, and the traverse chassis 54 has also moved to the position shown by the phantom 54'.

On the other hand, if the driving plates 56R and 56L located at the positions shown by the phantoms 56R' and 56L' are moved in the direction pointed by the arrow B, the traverse chassis 54 located at the position shown by the phantom 54' rises in the direction pointed by the arrow C. When the driving plates 56R and 56L are back in the positions represented by the solid lines in FIG. 1, the traverse chassis 54 also finishes rising and is back in the position represented by the solid lines in FIG. 1.

And when the traverse chassis 54 has risen to the position represented by the solid lines in FIG. 1, the disk 205 is mounted on the spindle motor 52. Then, the head 53 is ready to perform a read and/or write operation on the disk 205. To enable these operations, however, the shutters provided for the disk cartridge 200 need to be opened first.

For that purpose, the disk drive 51 includes a shutter driving mechanism to be described in detail below. Also, to drive the shutter driving mechanism, a driving pin 60 is provided for the driving plate 56L as shown in FIG. 1. As the driving plate 56L moves, the driving pin 60 goes back and forth within the range Q.

Figure 2:
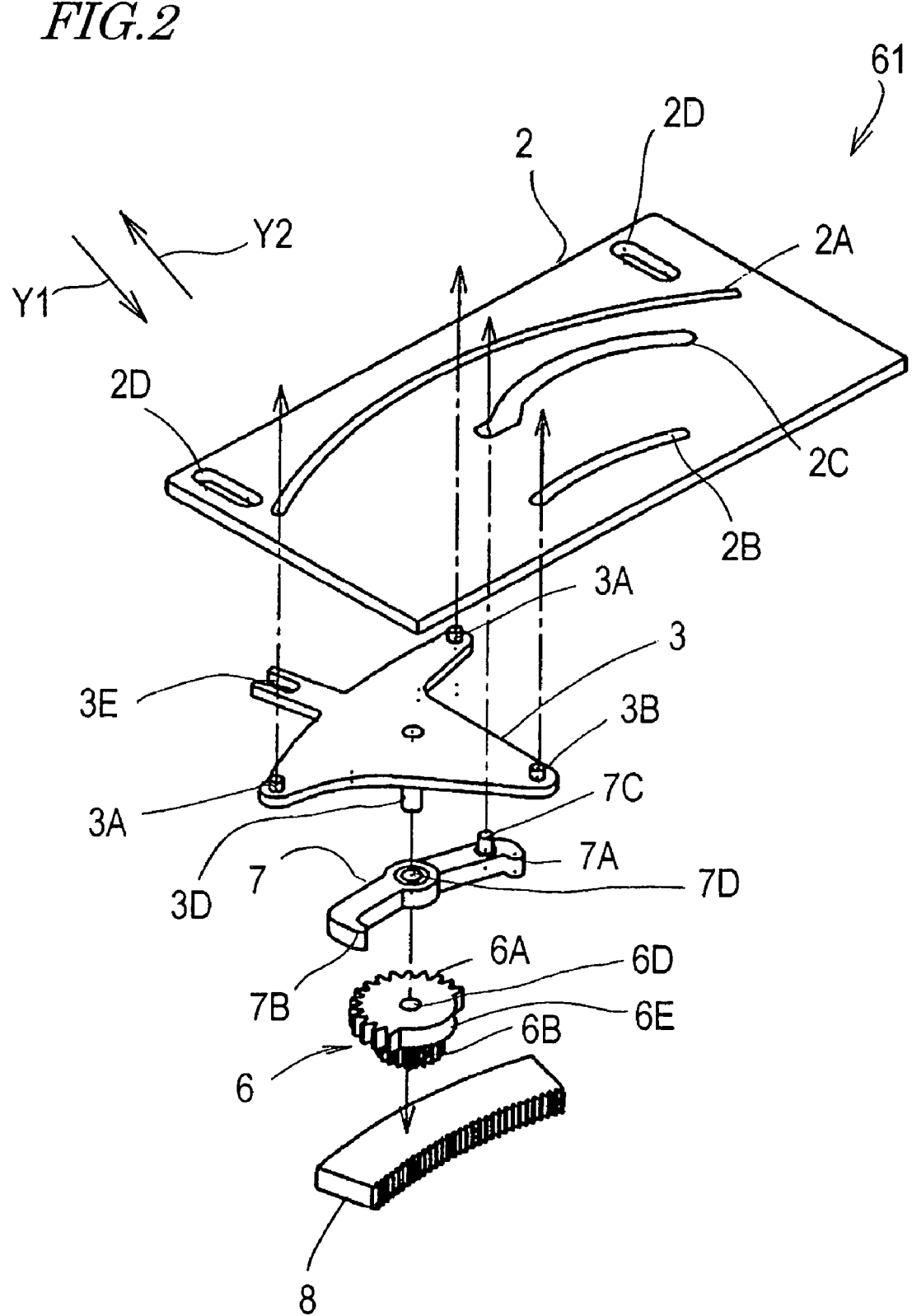
FIG. 2 is an exploded perspective view illustrating a shutter driving mechanism for the disk drive.

FIG. 2 is an exploded perspective view of the shutter driving mechanism 61. The shutter driving mechanism 61 includes a base 2, a holder 3, a first lever portion 7A, a second lever portion 7B, a driving gear 6 and a front gear 8.

The driving gear 6 engages with the gear 204E provided for the rotational member 204 of the disk cartridge 200, thereby contributing to the rotation of the rotational member 204. The driving gear 6 includes a big gear 6A, of which the teeth engage with the gear 204E, and a small gear 6B to receive driving force.

The front gear 8 is an internal gear, which is secured to the base 2 so as to move along with the base 2. The big and small gears 6A and 6B are integrated together and rotate around a hole 6D. The big gear 6A is an intermittent gear having a deficient portion 6E with no teeth. The small gear 6B engages with the front gear 8 that can move along with the base 2.

In this preferred embodiment, the first and second lever portions 7A and 7B form integral parts of a single driving lever 7 and turn around a hole 7D. A boss 7C is further provided for the driving lever 7. The first and second lever portions 7A and 7B respectively fit with the first and second notches 204D and 204F of the rotational member 204 of the disk cartridge 200. If only one of the first and second notches is provided for the rotational member, then the shutter driving mechanism 61 may also include only its associated lever portion.

The holder 3 includes first and second pins 3A and 3B, which are provided on one surface thereof, and a shaft 3D and a driving groove 3E, which are provided on the other surface thereof. The shaft 3D is inserted into the hole 7D of the driving lever 7 and into the hole 6D of the driving gear 6 such that the holder 3 holds the driving lever 7 and the driving gear 6. In this preferred embodiment, the holder 3 includes a pair of first pins 3A and a single second pin 3B.

The base 2 has a first guide groove 2A to interlock with the first pins 3A of the holder 3, a cam groove 2C to interlock with the boss 7C of the driving lever 7, and a second guide groove 2B to interlock with the second pin 3B of the holder 3. The first and second guide grooves 2A and 2B are drawn in arc traces, and have their centers substantially matched with that of the rotational member 204 when the shutter driving mechanism 61 is located close to the disk cartridge 200 to open or close the shutters of the disk cartridge 200.

The holder 3, holding the driving lever 7 and the driving gear 6 thereon, can do a swinging motion by moving the first and second pins 3A and 3B along the first and second guide grooves 2A and 2B of the base 2, respectively. This swinging motion is performed around the center of the arc traces defining the first and second guide grooves 2A and 2B, i.e., with respect to the center of the rotational member 204 of the disk cartridge 200 when the shutter driving mechanism 61 is located by the disk cartridge 200 to open or close the shutters of the disk cartridge 200. In this case, the small gear 6B of the driving gear 6 engages with the front gear 8. Thus, as the holder 3 swings, the driving gear 6 turns and the boss 7C of the driving lever 7 moves along the cam groove 2C. Accordingly, the angle of rotation of the driving lever 7 is defined by the profile of the cam groove 2C.

As will be described in detail below, while the shutters are opening or closing, one of the first lever portion 7A, the driving gear 6 and the second lever portion 7B interlocks with the rotational member 204 most of the time, thereby transmitting driving force to rotate the rotational member 204. The cam groove 2C is adjusted and the driving gear 6 is provided with the deficient portion 6E such that the other two do not interlock with the rotational member 204 in the meantime.

Figure 3:
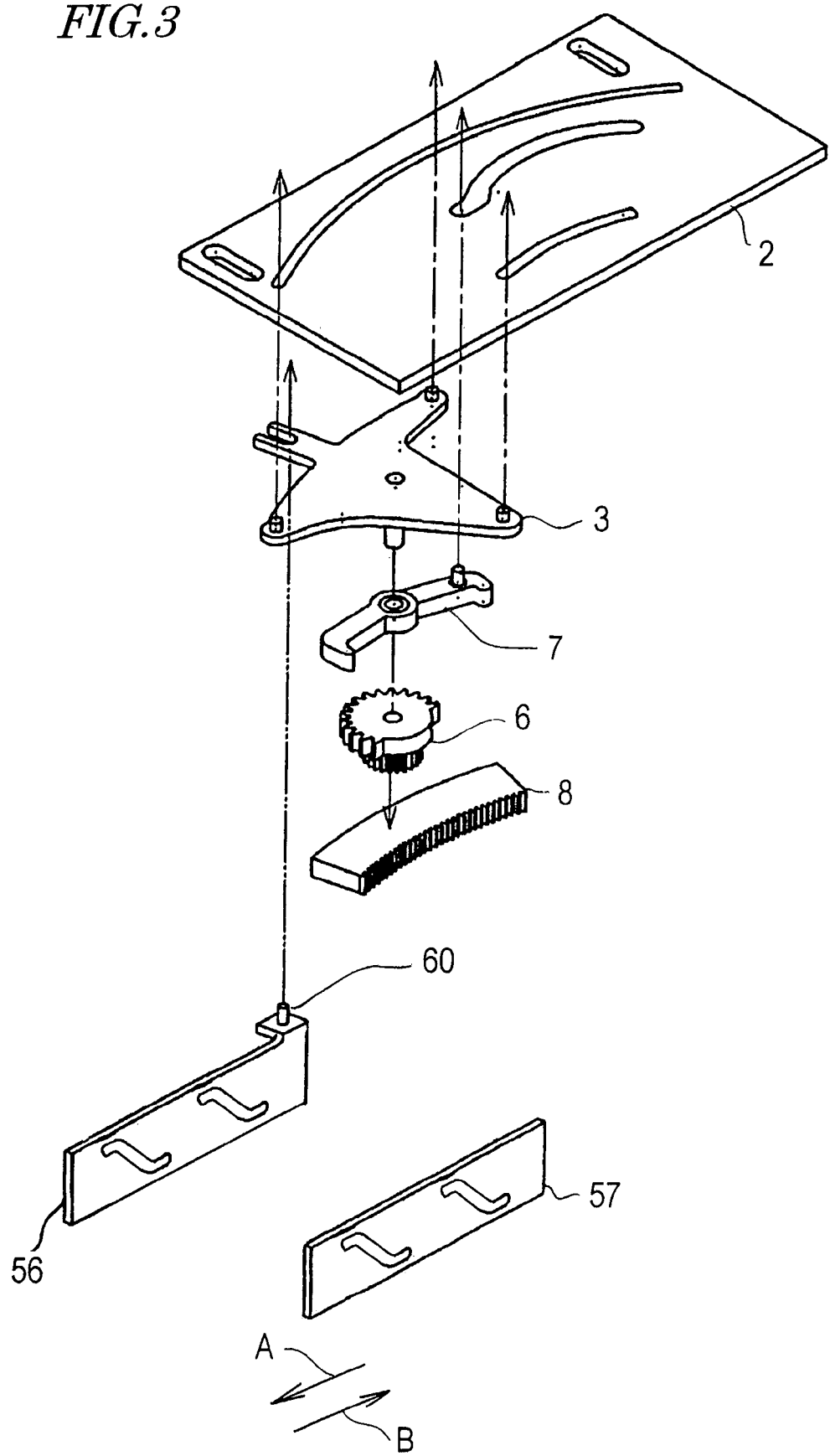
FIG. 3 is a perspective view illustrating the shutter driving mechanism and a structure for driving the shutter driving mechanism.

The swinging motion of the holder 3 is set up by the driving pin 60 that fits with the driving groove 3E of the holder 3. As shown in FIG. 3, when the driving plates 56R and 56L move in the arrow direction A or B, the driving pin 60 also moves in the same direction A or B. As a result, the holder 3 swings. The arrow direction A or B is parallel to a side surface of the cartridge body, which has a window to partially expose the outer periphery of the rotational member 204.

As already described with reference to FIG. 1, the driving plates 56R and 56L are used to vertically displace (i.e., lift or lower) the traverse base 54. Accordingly, in this preferred embodiment, as the shutters of the disk cartridge 200 are going to open or close, the spindle motor 52 and head 53 are lifted or lowered. Opening or closing of the shutters and lifting or lowering of the traverse base do not have to occur concurrently. In any case, however, while the disk 205 is mounted on the spindle motor 52, the shutters may not be closed.

It should be noted that the base 2 further has a third guide groove 2D and is designed so as to be movable along with the holder 3 in the direction pointed by the arrow Y1 or Y2.

Hereinafter, it will be described in further detail how the disk drive 51 opens and closes the shutters of the disk cartridge 200. In the drawings to be referred to in the following description, only the shutter driving mechanism 61 and the rotational member 204 of the disk cartridge 200 are illustrated on a larger scale to make the operation of the shutter driving mechanism 61 easily understandable.

Figure 4:
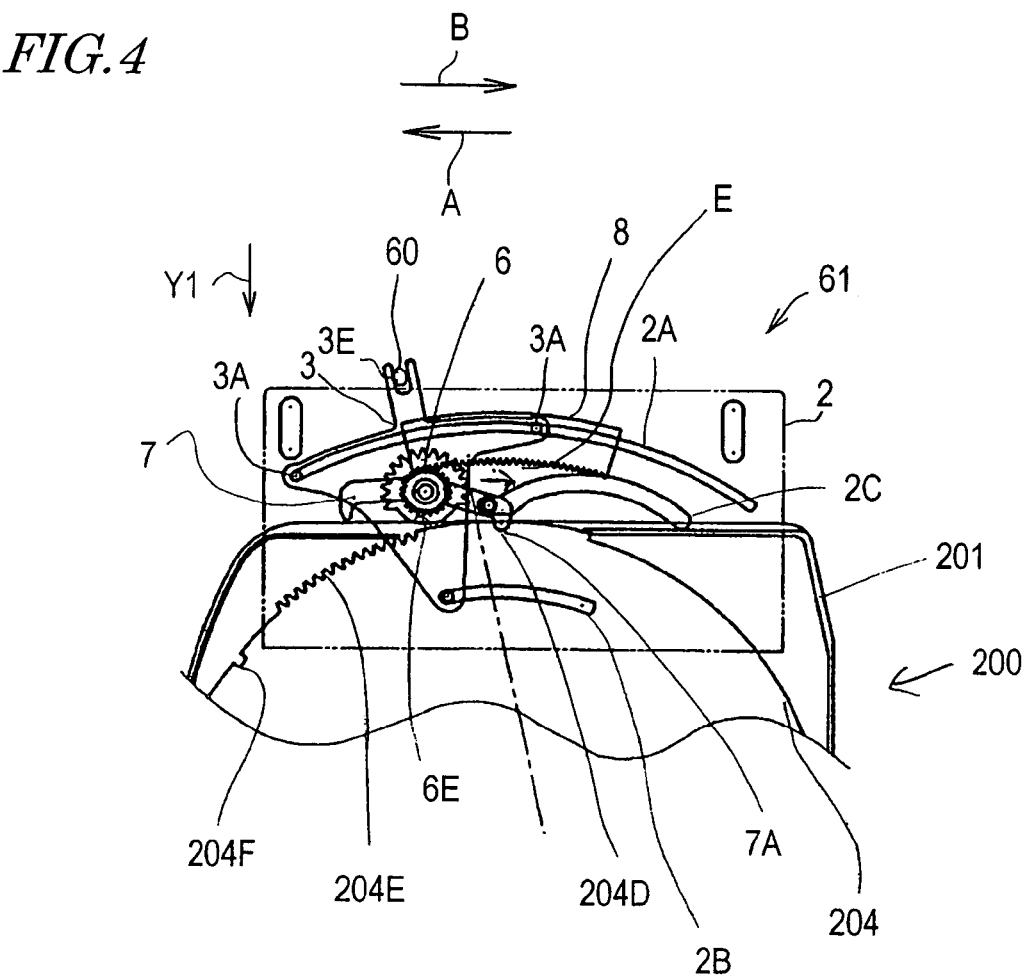
FIG. 4 is a plan view illustrating how the shutter driving mechanism works.

As shown in FIG. 4, when the disk cartridge 200, having been inserted into the disk drive 51 using a tray, for example, is fixed at a predetermined position, the shutter driving mechanism 61 starts to move toward the center of rotation of the rotational member 204 of the disk cartridge 200 as pointed by the arrow Y1. The shutter driving mechanism 61 continues to move until the first lever portion 7A thereof gets interlocked with the first notch 204D of the rotational member 204.

At this point in time, the driving gear 6 has such an angle of rotation that the deficient portion 6E of the big gear 6 faces the rotational member 204 of the disk cartridge 200. Thus, the driving gear 6 does not contact with the rotational member 204. The gear 204E of the rotational member 204 is currently stored within the cartridge body 201 and is not exposed through any side surface thereof.

In such a state, the driving plates 56 move in the arrow direction B and the driving pin 60 also moves in the same direction B. When the driving force of the driving pin 60 is transmitted from the driving groove, fitted with the driving pin 60, to the holder 3, the holder 3 is guided along the first and second guide grooves 2A and 2B to start to turn around the center of rotation of the rotational member 204.

Figure 5:
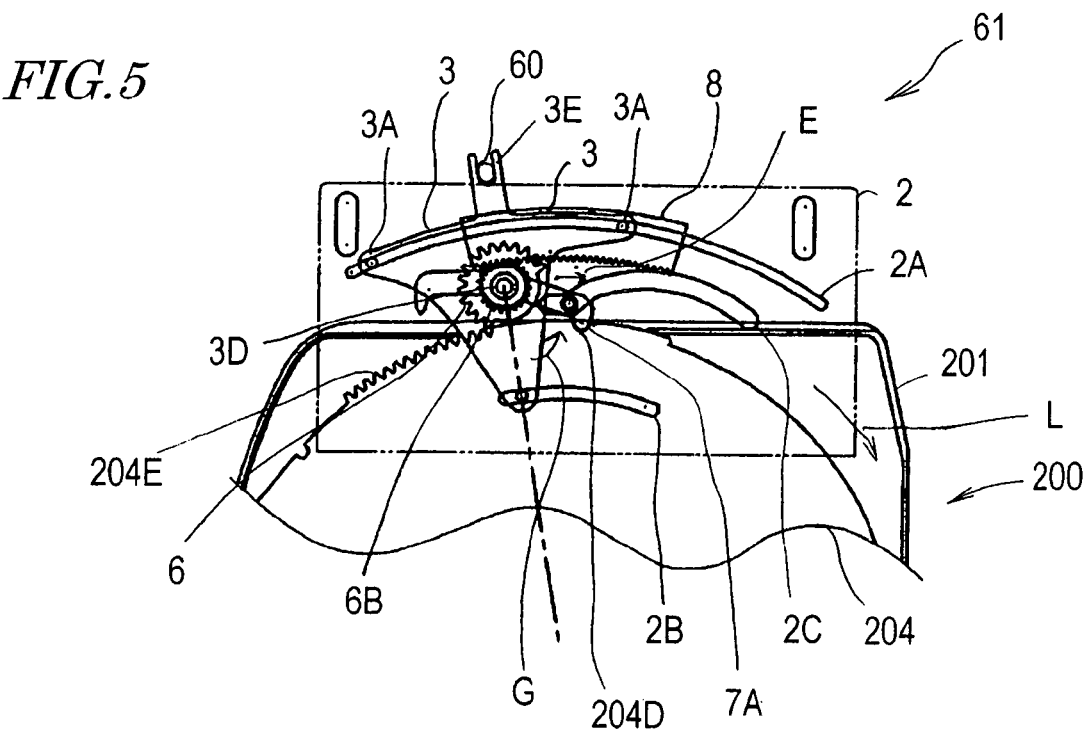
FIG. 5 is another plan view illustrating how the shutter driving mechanism works.

As shown in FIG. 5, as the first and second pins 3A and 3B of the holder 3 move along the first and second guide grooves 2A and 2B, respectively, the holder 3 rotates. In the meantime, the boss 7C of the driving lever 7 moves along the cam groove 2C of the base 2. Accordingly, the driving lever 7 turns on the shaft 3D of the holder while having its angle of rotation defined by the cam groove 2C. In addition, as the holder 3 moves, the shaft 3D also turns around the center of rotation of the rotational member 204. As a result, the first lever portion 7A of the driving lever 7 rotates the rotational member 204 in the direction pointed by the arrow L while interlocking with the first notch of the rotational member 204.

The small gear 6B of the driving gear 6 is engaged with the front gear 8. Driving force is produced to turn the driving gear 6 on the shaft 3D of the holder 3 in the direction pointed by the arrow G.

Figure 6:
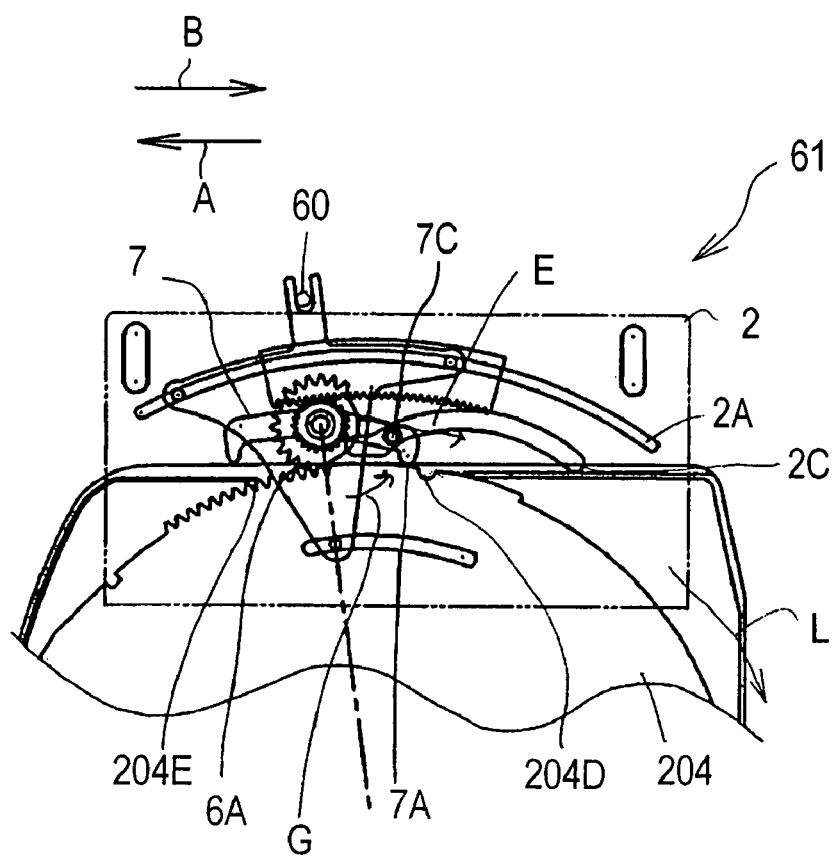
FIG. 6 is still another plan view illustrating how the shutter driving mechanism works.

As shown in FIG. 6, as the driving pin 60 further moves in the arrow direction B, the holder 3 is further guided along the first and second guide grooves 2A and 2B in the direction pointed by the arrow E. The angle of the driving lever 7 is defined by the cam groove 2C such that the first lever portion 7A keeps engaged with the first notch 204D of the rotational member 204 until a predetermined position. Thus, the rotational member 204 is rotated in the arrow direction L by the driving lever 7. Thereafter, the first lever portion 7A disengages itself from the first notch 204D of the rotational member 204 according to the profile of the cam groove 2C.

At this point in time, the gear 204E of the rotational member 204 starts to expose itself through a side surface of the cartridge body 201. Meanwhile, the driving gear 6 has rotated in the arrow direction G to the point that the big gear 6A of the driving gear 6 is ready to get engaged with the gear 204E.

After that, the gear 204E and the big gear 6A of the driving gear 6 engage with each other and the rotational force of the driving gear 6 is transmitted to the rotational member 204, thereby rotating the rotational member 204. Also, as the rotational member 204 rotates, the shutters 202 and 203, interlocked with the rotational member 204, open themselves, thereby opening the window 201C.

Figure 7:
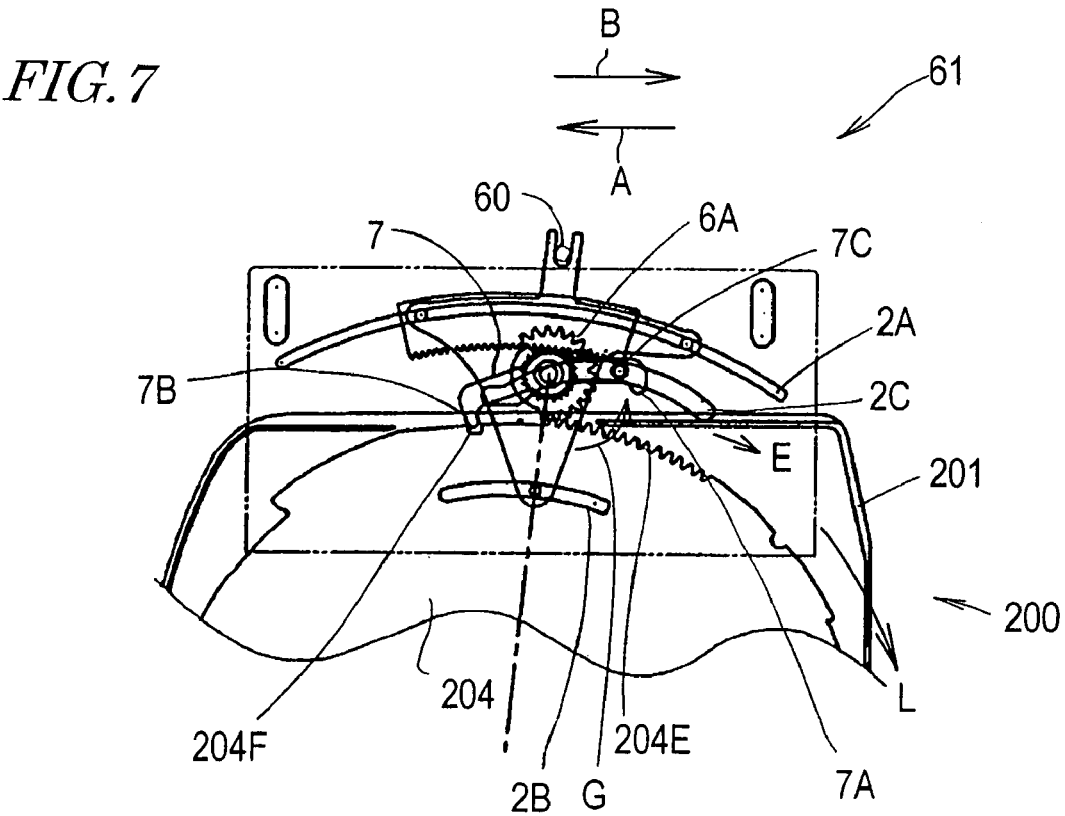
FIG. 7 is yet another plan view illustrating how the shutter driving mechanism works.

As shown in FIG. 7, as the driving pin 60 further moves in the arrow direction B, the holder 3 is further guided along the first and second guide grooves 2A and 2B in the arrow direction E.

As the front gear 8 and the small gear 6B of the driving gear 6 engage with each other, the rotational driving force is transmitted to the driving gear 6. Accordingly, when the big gear 6A of the driving gear 6 gets engaged with the gear 204E, the rotational member 204 further rotates in the arrow direction L and the driving gear 6 further rotates in the arrow direction G. According to the profile of the cam groove 2C, the first lever portion 7A disengages itself from the first notch 204D of the rotational member 204 but the second lever portion 7B comes close to the second notch 204F. And when the big gear 6A reaches the end of the gear 204, the second lever portion 7B gets engaged with the second notch 204F.

Figure 8:
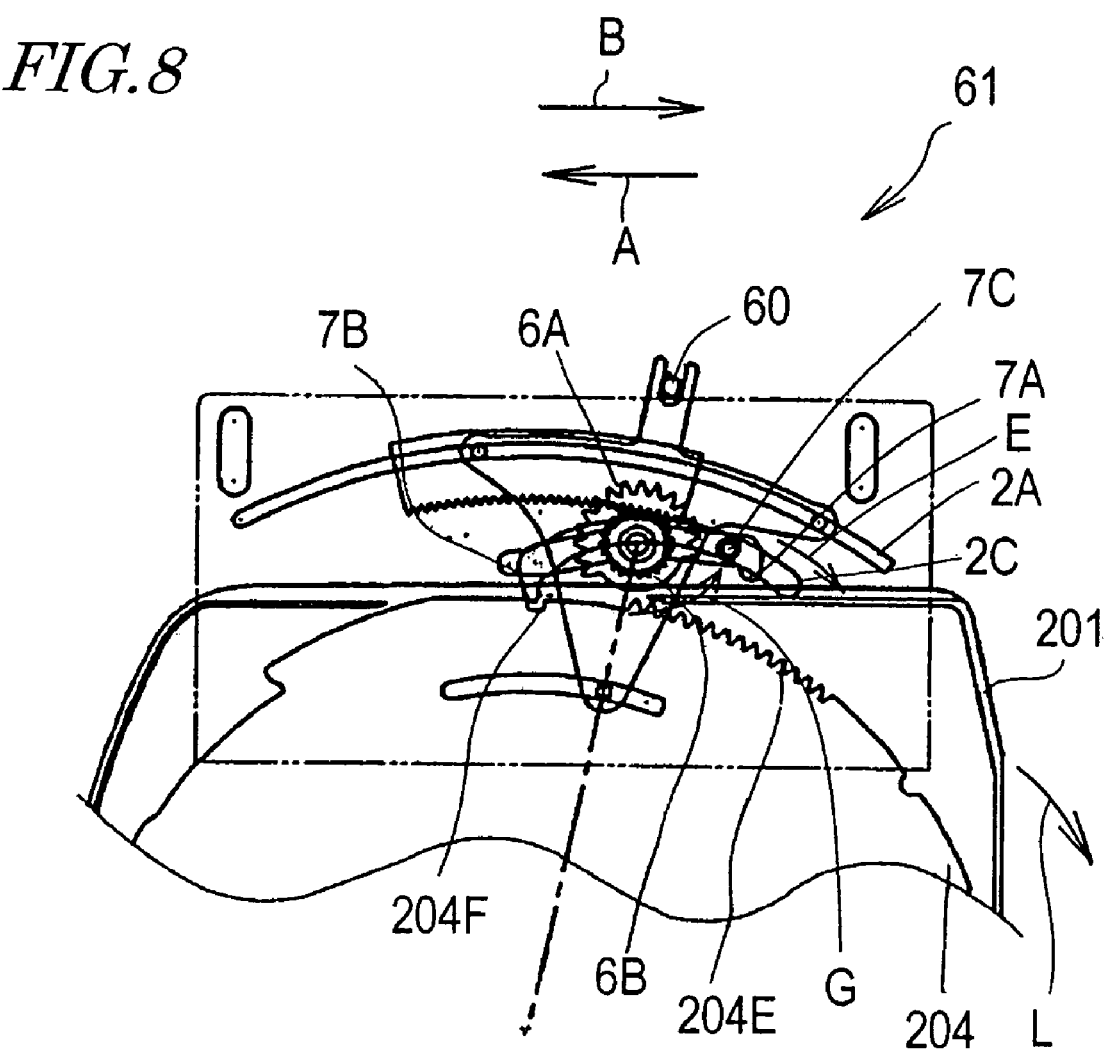
FIG. 8 is yet another plan view illustrating how the shutter driving mechanism works.

After that, the rotational member 204 is driven by the second lever portion 7B. As shown in FIG. 8, as the driving pin 60 further moves in the arrow direction B, the holder 3 is further guided along the first and second guide grooves 2A and 2B in the arrow direction E. As a result, the second lever portion 7B gets engaged with the rotational member 204 at the second notch 204F thereof, thereby further rotating the rotational member 204 in the arrow direction L.

Finally, the shutters 202 and 203, interlocked with the rotational member 204, open the window 201C fully to end the shutter opening operation. The gear 204E of the rotational member 204 is located inside of the cartridge body 201 again and is not exposed through the side surface anymore.

The second lever portion 7B and the second notch 204F are engaged with each other such that if the driving pin 60 starts to move in the arrow direction A when the shutter opening operation is ended as shown in FIG. 8, the second lever portion 7B can rotate the rotational member 204 in the opposite direction to that pointed by the arrow L. Accordingly, in performing the operation of closing the shutters 202 and 203 by rotating the rotational member 204 in the opposite direction to that pointed by the arrow L, the respective members work in the reverse procedure. As is clear from the foregoing description, as the driving pin 60 moves in the arrow direction A, the holder 3 moves in the opposite direction to that pointed by the arrow E, the driving gear 6 rotates in the opposite direction to that pointed by the arrow G, and the rotational member 204 rotates in the opposite direction to that pointed by the arrow L.

When the shutters close the window 201C fully to end the shutter closing operation, the shutter driving mechanism 61 is in the position shown in FIG. 4. The driving pin 60 is driven by the driving plates 56R and 56L. Accordingly, as the shutters are closed, the traverse chassis 54, on which the spindle motor 52 is fixed, lowers, thereby releasing the disk 205 from the spindle motor 52. After the shutters have been closed, the base 2 moves in the opposite direction to that pointed by the arrow Y1 and the shutter driving mechanism 61 goes away from the side surface of the disk cartridge 200. In this manner, the shutters are opened and closed.

As described above, the disk drive of the present invention drives the gear of the rotational member by turning the driving gear. Accordingly, compared with a situation where the gear driving mechanism slides, a smaller driving space is needed. Thus, the driving mechanism for opening and closing the shutters can have a simplified structure, the size of the shutter opening/closing driving mechanism can be reduced, and the space for the driving mechanism can be cut down.

Also, if the rotational member has a gear and a notch, the driving mechanism preferably includes its associated lever portion. Then, by swinging the lever portion, the rotational member can be rotated, and the shutters can be opened and closed, accurately and smoothly.

In addition, since the overall driving mechanism can move toward the center of the rotational member, the timing to get the rotational member rotated by the driving gear can be adjusted. Accordingly, irrespective of the direction in which the disk cartridge is inserted, the shutter opening/closing timing can be arbitrarily selected.

Moreover, since the center of rotation of the driving gear matches that of the driving lever, the rotational member can be rotated with the relative positional relationship among the driving gear, the driving lever and the rotational member stabilized. Furthermore, the driving gear and the driving lever swing synchronously with each other, and therefore, can maintain a predetermined relative positional relationship. Accordingly, the timings to turn the driving lever and the rotational member can be synchronized with each other appropriately. As a result, the driving mechanism can drive the rotational member with good stability.

On top of that, by appropriately defining the ratio of the pitch diameter of the driving gear to that of the front gear and the ratio of the pitch diameter of the driving gear to that of the gear of the rotational member, the deceleration ratio can be optimized and the opening/closing rate of the cartridge shutters can be defined appropriately. For example, by setting the pitch diameter of the front gear greater than that of the gear of the rotational member, the shutters can be opened and closed just as intended even if the rpm of the driving gear is small.

Plus, by getting the driving gear and the front gear engaged with each other, the driving gear can generate rotational force when swinging. Thus, the rotational member can be rotated with a simplified structure and in a smaller space.

In addition, by aligning the rotation shaft of the driving lever with the center of rotation of the driving gear, the size of the driving mechanism can be reduced.

Furthermore, by providing a deficient portion for the driving gear, interference with no gear portions of the rotational member can be avoided easily.

What's more, if the shutter opening/closing mechanism includes a gear, a holder with first and second lever portions, and a base for supporting the holder in a swinging position, then the shutter opening/closing operation can be separated into two stages. In that case, while no data is being read from, written on, the disk, the cartridge shutters can be closed without moving the disk cartridge from its ready-to-read/write position. Accordingly, even if the disk cartridge were left in the disk drive, the cartridge shutters could be kept closed and the data side of the disk stored would not be exposed inside of the disk drive. As a result, no dust or dirt would deposit on the disk and the read and/or write operation on the disk would not be affected.

Furthermore, by getting the shutter opening/closing mechanism driven by the driving plates that drive the traverse chassis, the operation of opening or closing the shutters and the operation of mounting the disk on the motor can be synchronized with each other. As a result, in closing the shutters, the disk can be disengaged from the motor just as intended.

In the preferred embodiment described above, the first and second lever portions 7A and 7B form integral parts of the driving lever 7. Alternatively, the shutter driving mechanism may also be designed such that the first and second lever portions 7A and 7B operate independently of each other.

Figure 9:
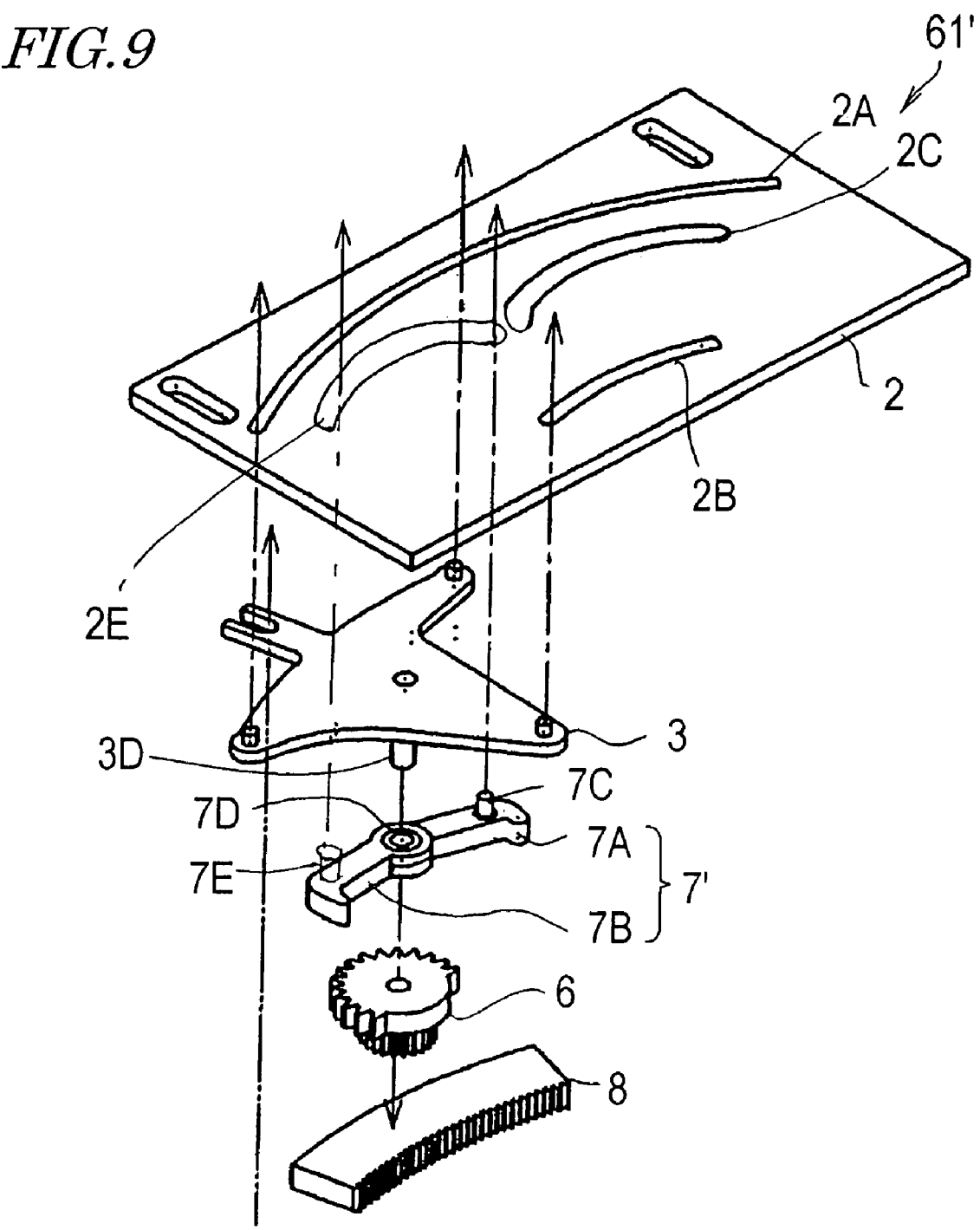
FIG. 9 is an exploded perspective view illustrating another exemplary shutter driving mechanism.
Figure 10:
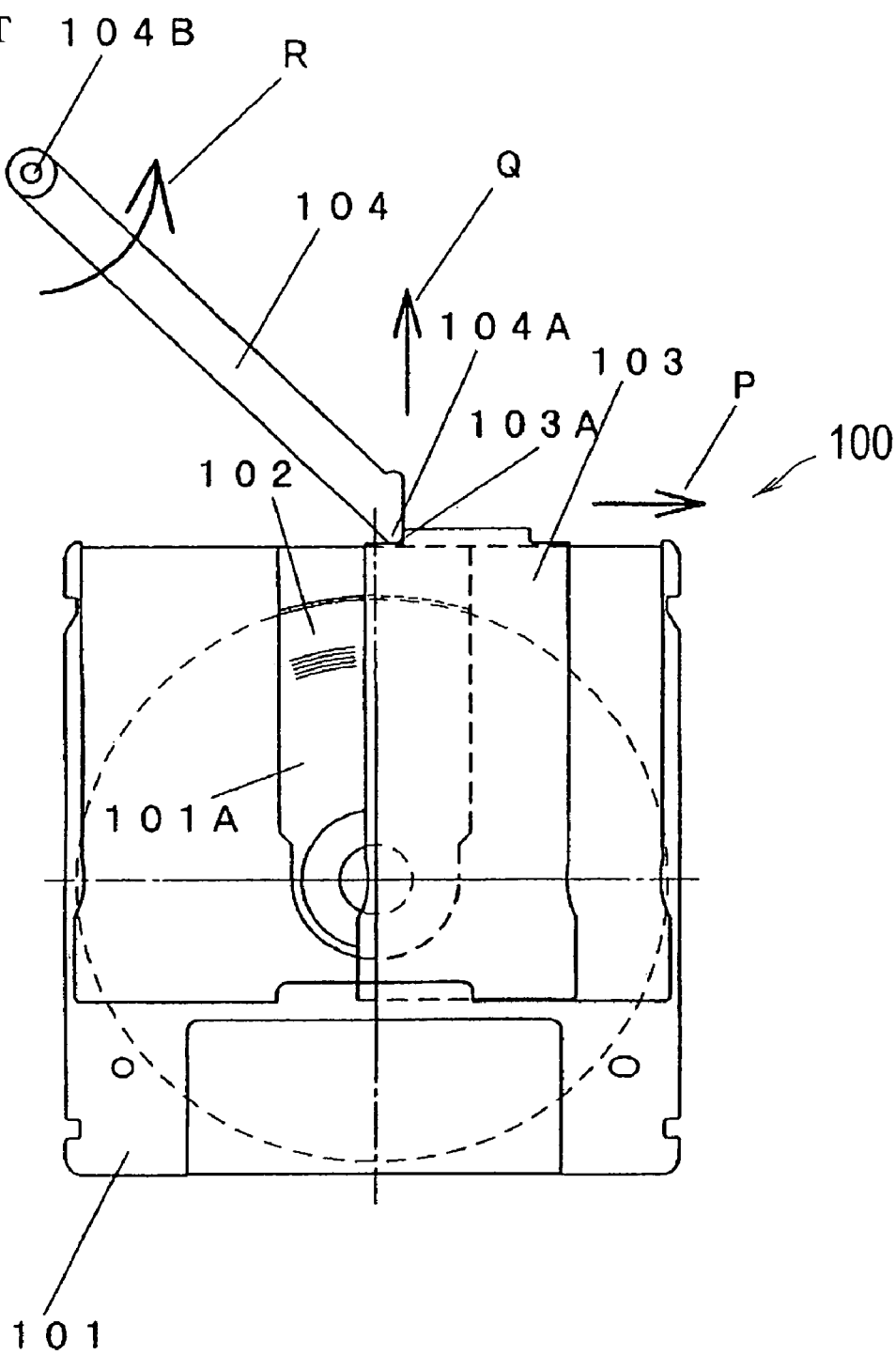
FIG. 10 is a plan view illustrating how to open the shutter of a conventional disk cartridge.
Figure 11:
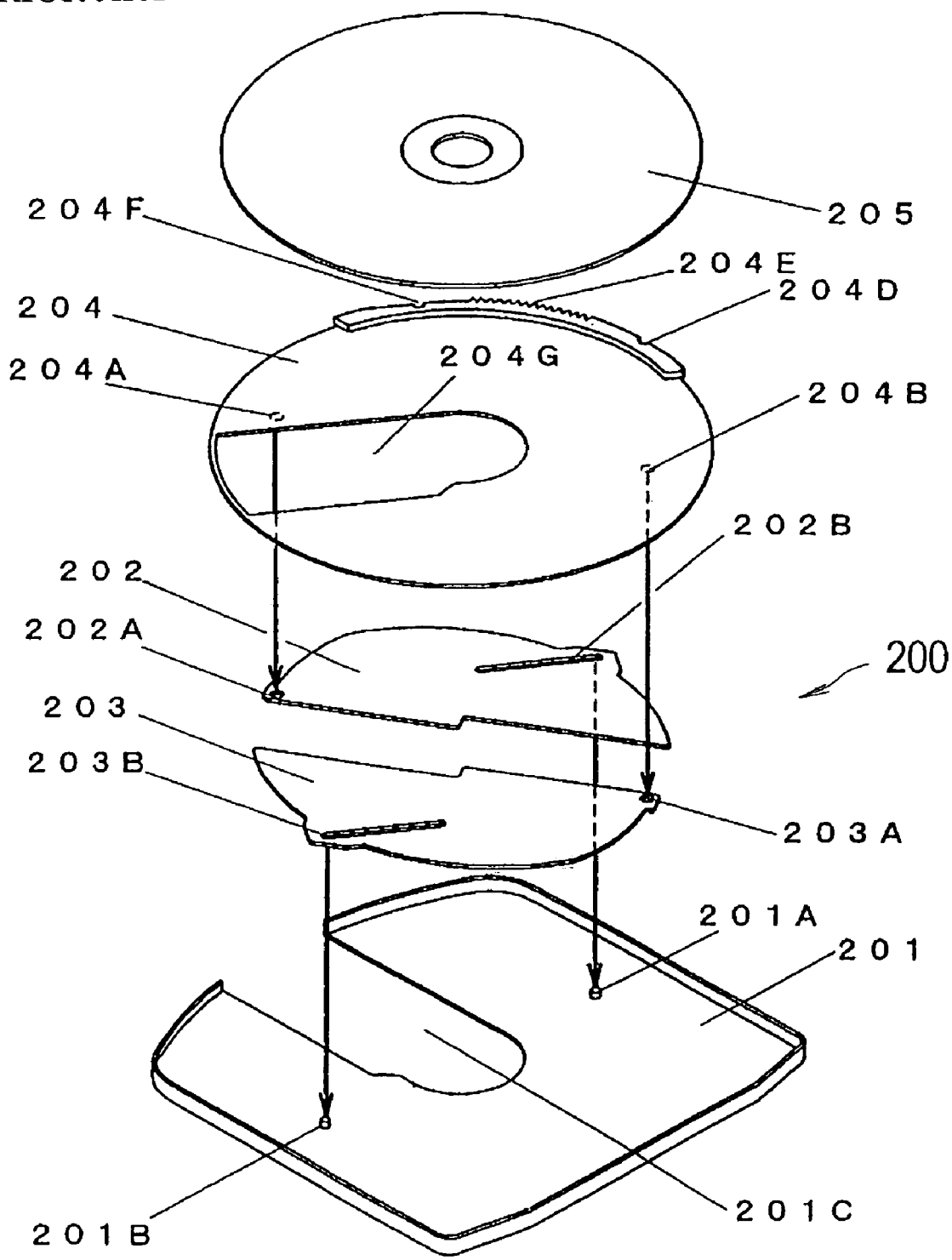
FIG. 11 is an exploded perspective view illustrating the structure of another conventional disk cartridge.
Figure 12:
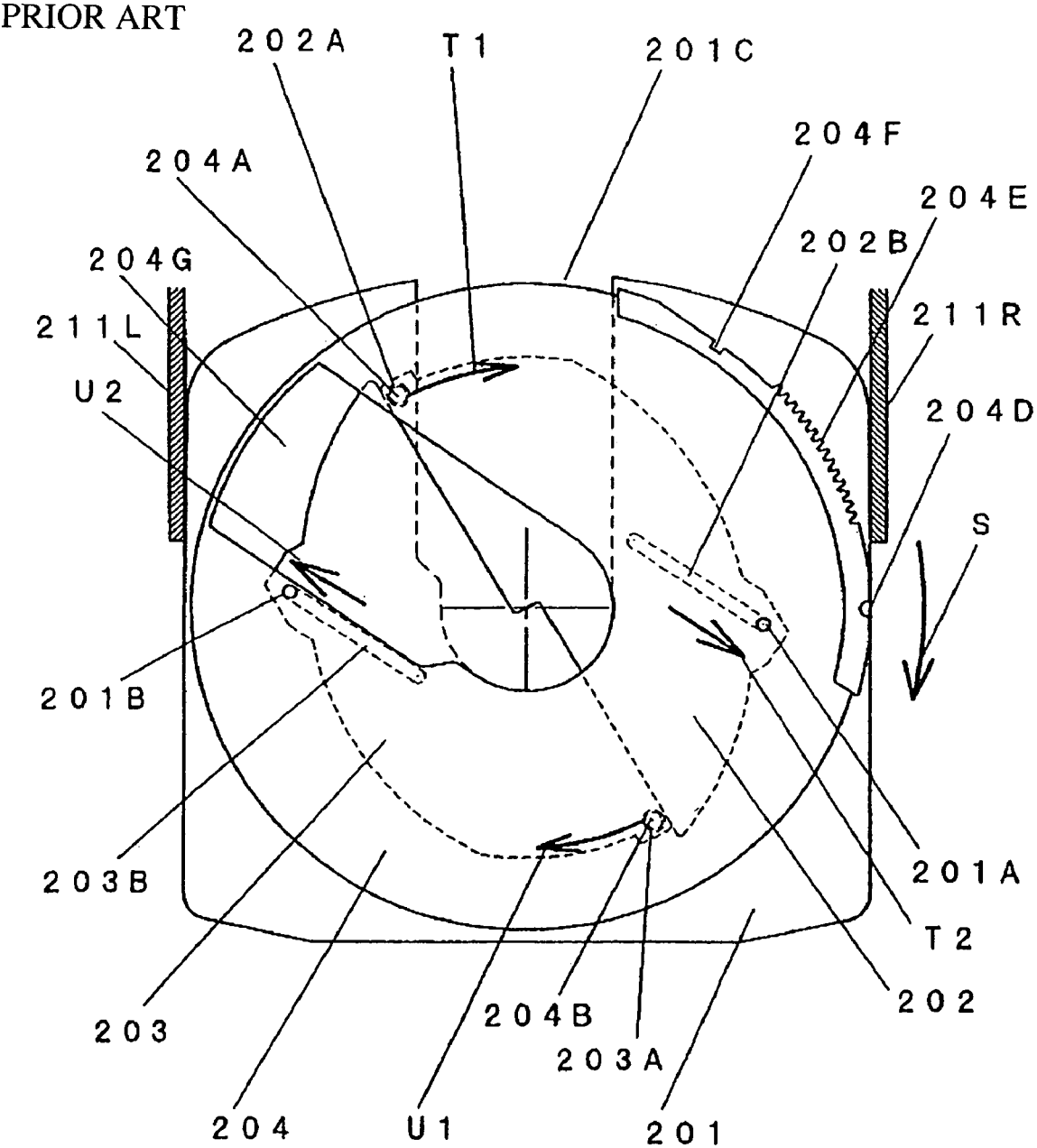
FIG. 12 is a plan view illustrating how to open and close the shutter of the disk cartridge shown in FIG. 11.
Figure 13:
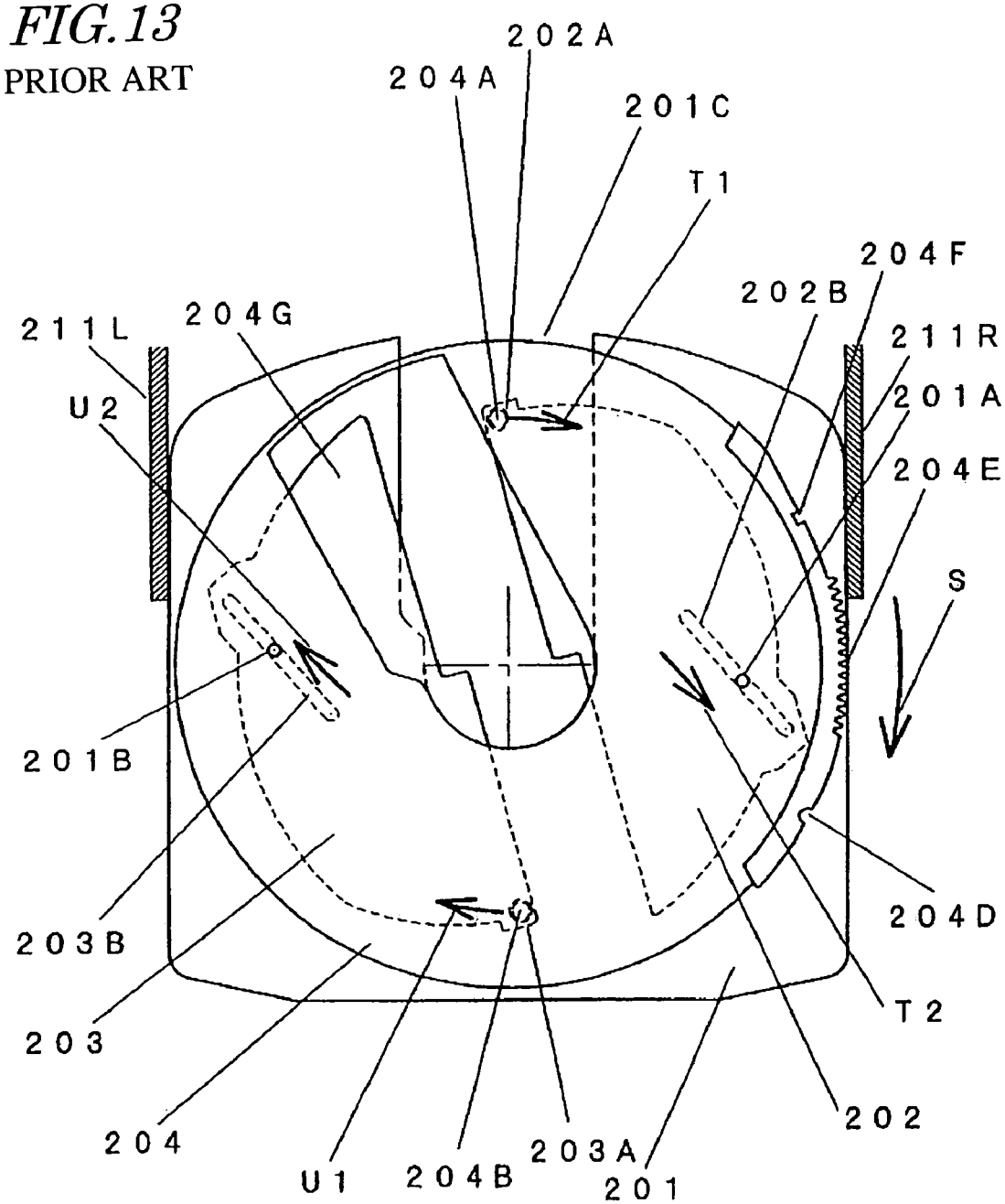
FIG. 13 is another plan view illustrating how to open and close the shutter of the disk cartridge shown in FIG. 11.
Figure 14:
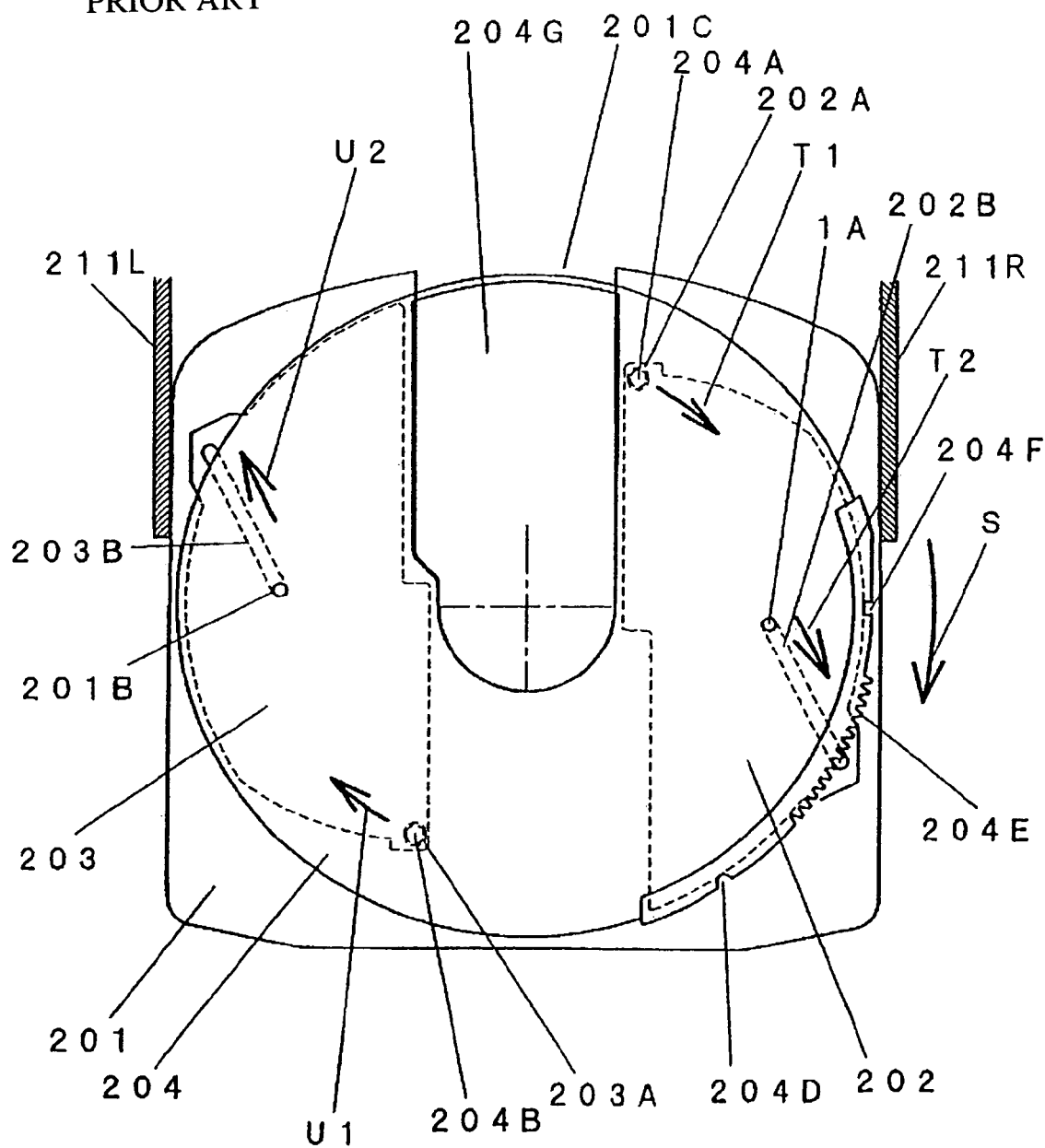
FIG. 14 is yet another plan view illustrating how to open and close the shutter of the disk cartridge shown in FIG. 11.
Figure 15:
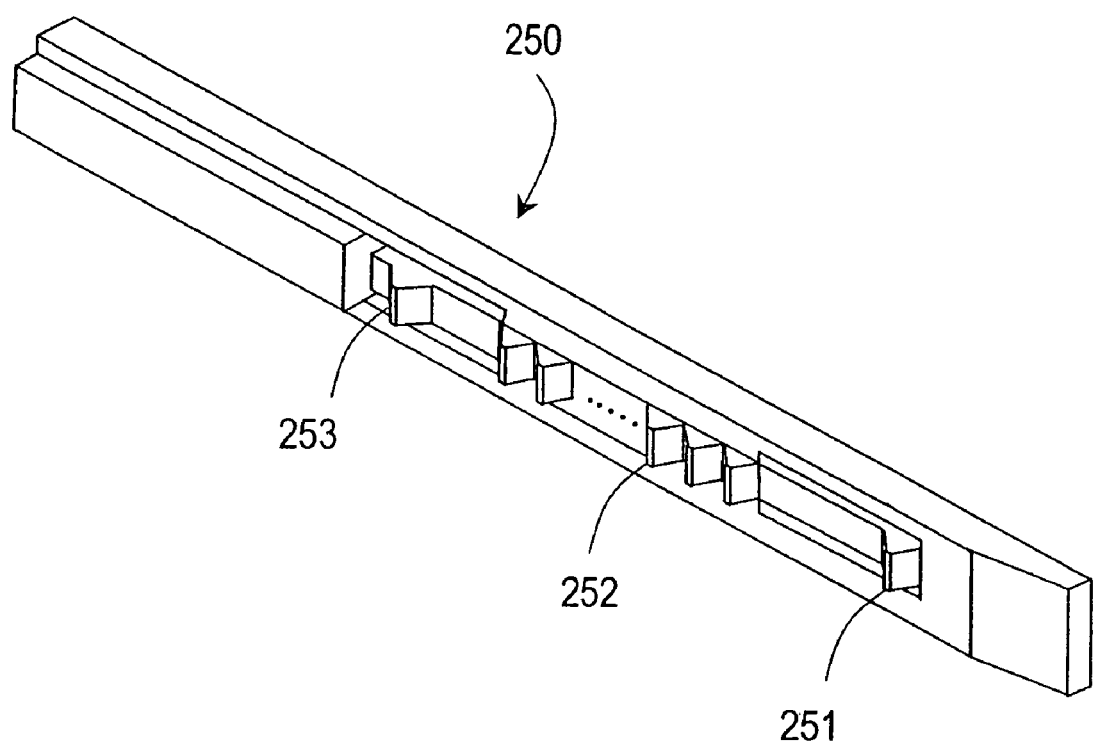
FIG. 15 is a perspective view illustrating a shutter driving means for opening and closing the shutter of the disk cartridge shown in FIG. 11.

For example, in the shutter driving mechanism 61' shown in FIG. 9, the driving lever 7' includes a first lever portion 7A and a second lever portion 7B, which can rotate around the shaft 3D independently of each other. The first and second lever portions 7A and 7B include bosses 7C and 7E, respectively.

The base 2 has a cam groove 2C interlocking with the boss 7C to define the angle of rotation of the first lever portion 7A and another cam groove 2E that defines the angle of rotation of the second lever portion 7B. These cam grooves 2C and 2E are independent of each other. Thus, the angle of rotation of one lever portion is not affected by that of the other. In FIG. 9, the first and second lever portions 7A and 7B turn on the same shaft. Alternatively, the driving lever 7' may also be designed such that the first and second lever portions 7A and 7B turn around mutually different axes.

Furthermore, the driving force for rotating the rotational member 204 is transmitted by interlocking the first lever portion 7A with the first notch 204D, engaging the big gear 6A and the gear 204E with each other and interlocking the second lever portion 7B with the second notch 204F. If the driving forces were transmitted through two different paths simultaneously when one of these three driving force transmission paths is switched into another, then the driving forces would interfere with each other. To avoid such interference of the driving forces transmitted, elastic force may be applied to the first and second lever portions 7A and 7B toward the first and second notches 204D and 204F, respectively, and recesses may be provided in the opposite direction.

In the preferred embodiment described above, the driving gear 6, driving lever 7 and front gear 8 horizontally move all together in the direction pointed by the arrow Y1 or in the opposite direction. However, these members may be moved in any other direction as long as the driving gear 6 and the driving lever 7 can take a position for transmitting the driving force to the rotational member 204 and a position for transmitting no driving force to the rotational member 204. For example, these members may be moved parallel to the axis of rotation of the rotational member 204.

Also, in the preferred embodiment described above, the disk cartridge is moved in the arrow direction A or B and loaded into the disk drive by using a disk tray. However, the disk cartridge may be loaded into the disk drive by moving the disk cartridge perpendicularly to the direction A or B.

Furthermore, in the preferred embodiment described above, the driving force for turning the driving gear 6 is generated by swinging the driving gear 6 around the center of rotation of the rotational member 204 and getting the driving gear 6 engaged with the front gear 8. This is a so-called "planetary gear mechanism". However, the same effects are achieved even if the driving gear 6 is turned by any other driving system (e.g., a separate driving source).

It should be noted that the gear specifications (such as the modules and the numbers of gear teeth) of the gear 204E provided for the rotational member 204, the big gear 6A and the small gear 6B are appropriately selected according to the configuration or mode of operation and are not limited to those illustrated in the drawings. The center of rotation of the rotational member 204 does not have to match the center of the disk 205 that is held or stored in the disk cartridge body.

INDUSTRIAL APPLICABILITY

The present invention provides a disk drive, which is adapted to a disk cartridge with a structure for opening and closing a shutter by rotating a rotational member, which has a space-saving and simplified design, and which also has a mechanism that can open and close the shutter safely and just as intended.

The invention claimed is:

1. A disc drive adapted to a disk cartridge that includes: a disk; a body to contain the disk; a window, which is provided for the body so as to allow a data reading and/or writing head to access the disk; a shutter for opening or closing the window; and a rotational member, which includes a gear as a part of its outer periphery and which rotates to open or close the shutter, the disk drive comprising:
- a motor for spinning the disk;
- a holding portion for holding the disk cartridge so as to allow the motor to spin the disk;
- the data reading and/or writing head, which is movable almost along the radius of the disk that is held on the holding portion; and
- a shutter driving mechanism for opening and closing the shutter by rotating the rotational member of the disk cartridge,
- wherein the shutter driving mechanism includes a driving gear, which engages with the gear of the rotational member and which turns around a first rotation shaft, the first rotation shaft swinging around the center of rotation of the rotational member of the disk cartridge that is held on the holding portion.

2. The disc drive of claim 1, wherein the rotational member of the disk cartridge includes first and second notches, which are defined along the outer periphery so as to interpose the gear between them, and wherein the shutter driving mechanism further includes first and second lever portions that engage with the first and second notches, respectively.

3. The disc drive of claim 2, wherein the shutter driving mechanism is able to swing around the center of the rotational member of the disk cartridge.

4. The disc drive of claim 2, wherein the first and second lever portions transmit rotational driving force to the rotational member while swinging around the center of rotation of the rotational member.

5. The disc drive of claim 2, wherein the first and second lever portions form integral parts of a single driving lever.

6. The disc drive of claim 5, wherein the driving lever is rotatable around the first rotation shaft.

7. The disc drive of claim 1, wherein the driving gear includes a big gear and a small gear, which is provided coaxially with the big gear and which turns synchronously with the big gear, and wherein the shutter driving mechanism further includes a front gear engaging with the small gear.

8. The disc drive of claim 7, wherein the pitch diameter of the front gear is larger than that of gear teeth of the rotational member.

9. The disc drive of claim 1, wherein the driving gear is an intermittent gear, which has no gear teeth where the driving gear does not engage with the gear of the rotational member.

10. The disc drive of claim 1, wherein in reading or writing no data from/on the disk, the disk drive controls the shutter driving mechanism so as to close the shutter.

11. The disc drive of claim 7, wherein the shutter driving mechanism further includes:
- a holder for holding together the driving gear, the first lever portion and the second lever portion; and
- a base for supporting the holder so as to allow the holder to swing around the center of rotation of the rotational member, the base being movable almost along the radius of the disk.

12. The disc drive of claim 11, wherein the front gear is an internal gear, which is secured to the base so as to turn around the center of rotation of the rotational member.

13. The disc drive of claim 11, wherein the base has a cam groove, at least one of the first and second lever portions having a protrusion that interlocks with the cam groove.

14. The disc drive of claim 11, wherein the holder is driven by a driving portion that shifts substantially parallel to a side surface of the body, the side surface having a window to partially expose the rotational member.

15. The disc drive of claim 14, further comprising a traverse chassis with a guide for guiding the head almost along the radius of the disk, wherein the head is supported on the guide and the motor is fixed on the traverse chassis.

16. The disc drive of claim 15, further comprising a driving plate for lifting or lowering the traverse chassis.

17. The disc drive of claim 16, wherein the traverse chassis has a protrusion and the driving plate has a cam groove that fits with the protrusion, and wherein the driving plate shifts substantially parallel to the side surface of the body, thereby lifting or lowering the traverse chassis.

18. The disc drive of claim 17, wherein the driving portion is a protrusion provided on the driving plate.

* * * * *